Aug. 29, 1933.  W. H. MASON  1,924,162
CUT-OFF MACHINE
Filed Oct. 18, 1930   5 Sheets-Sheet 1

INVENTOR
William H Mason
BY
Dyke and Schaines
ATTORNEYS

Aug. 29, 1933.    W. H. MASON    1,924,162
CUT-OFF MACHINE
Filed Oct. 18, 1930    5 Sheets-Sheet 2
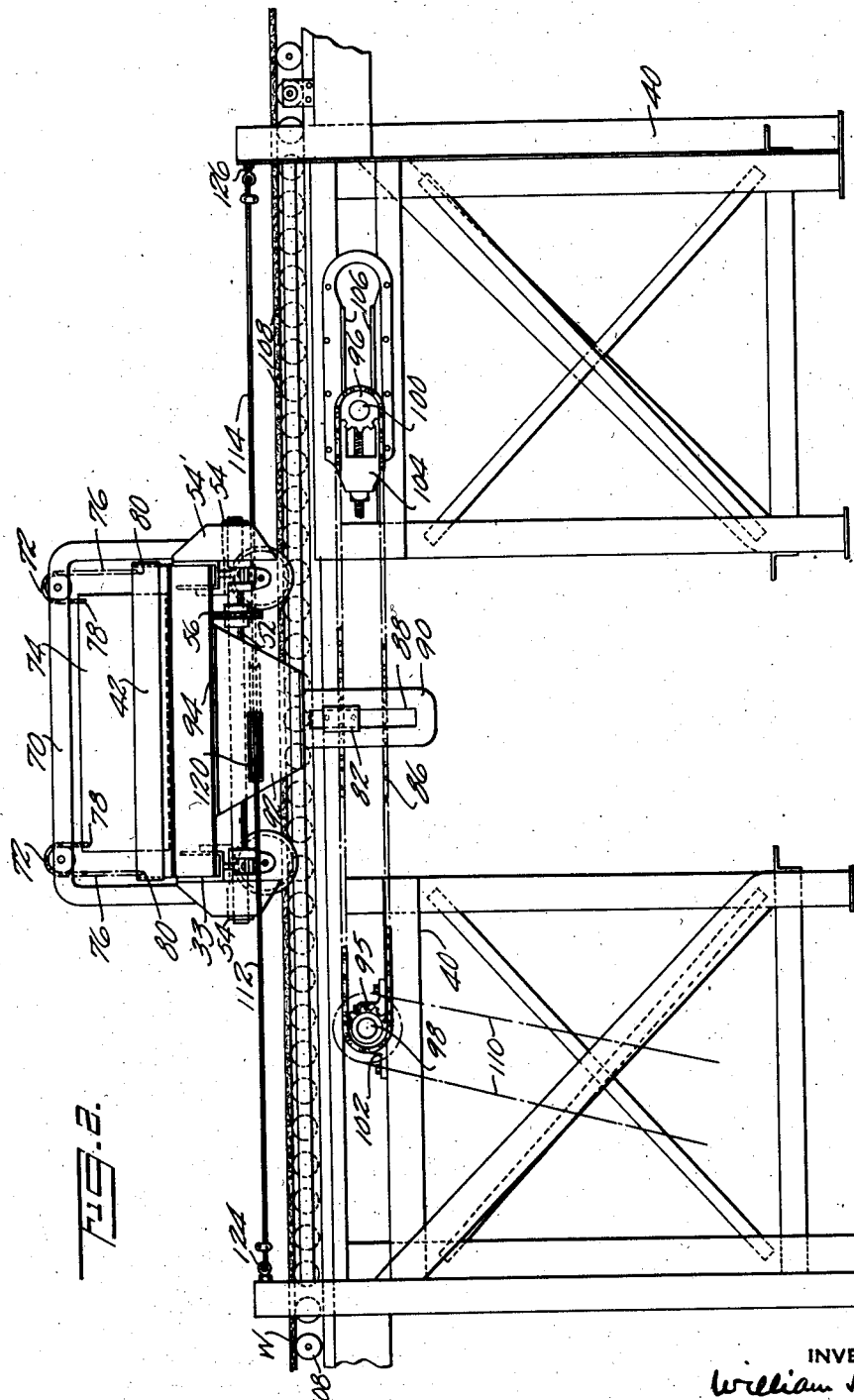
INVENTOR
William H Mason
BY
Dyke and Schames
ATTORNEYS

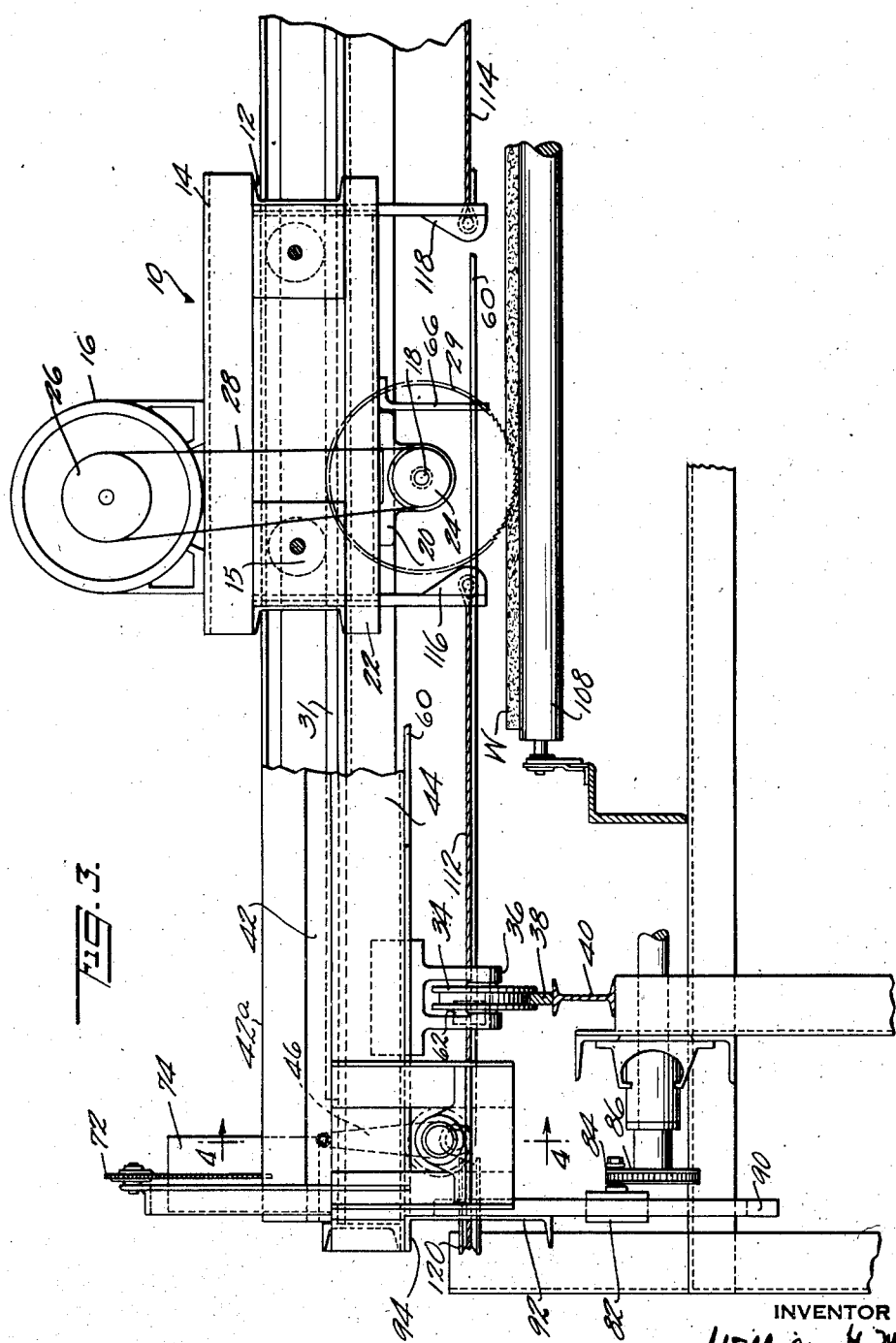

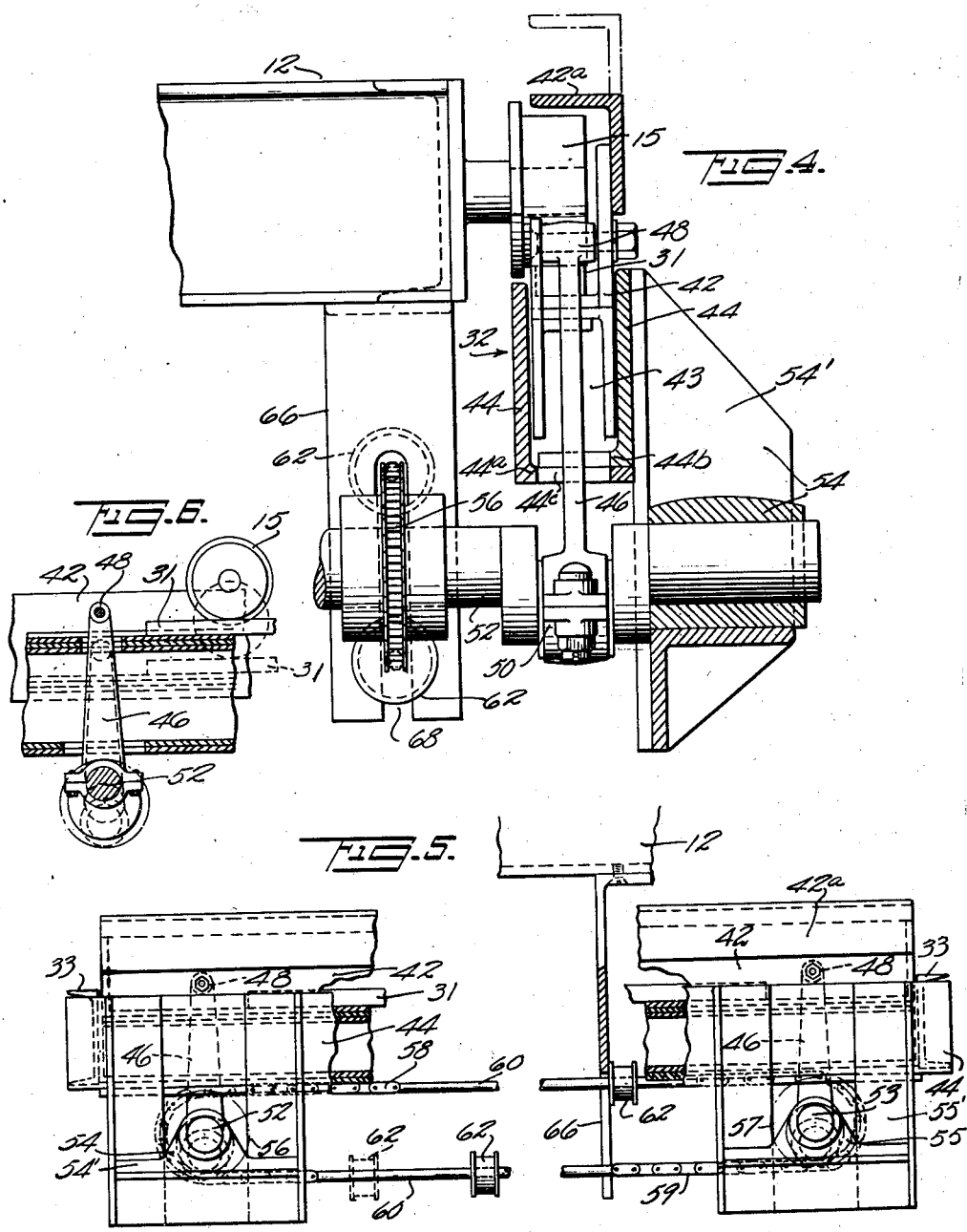

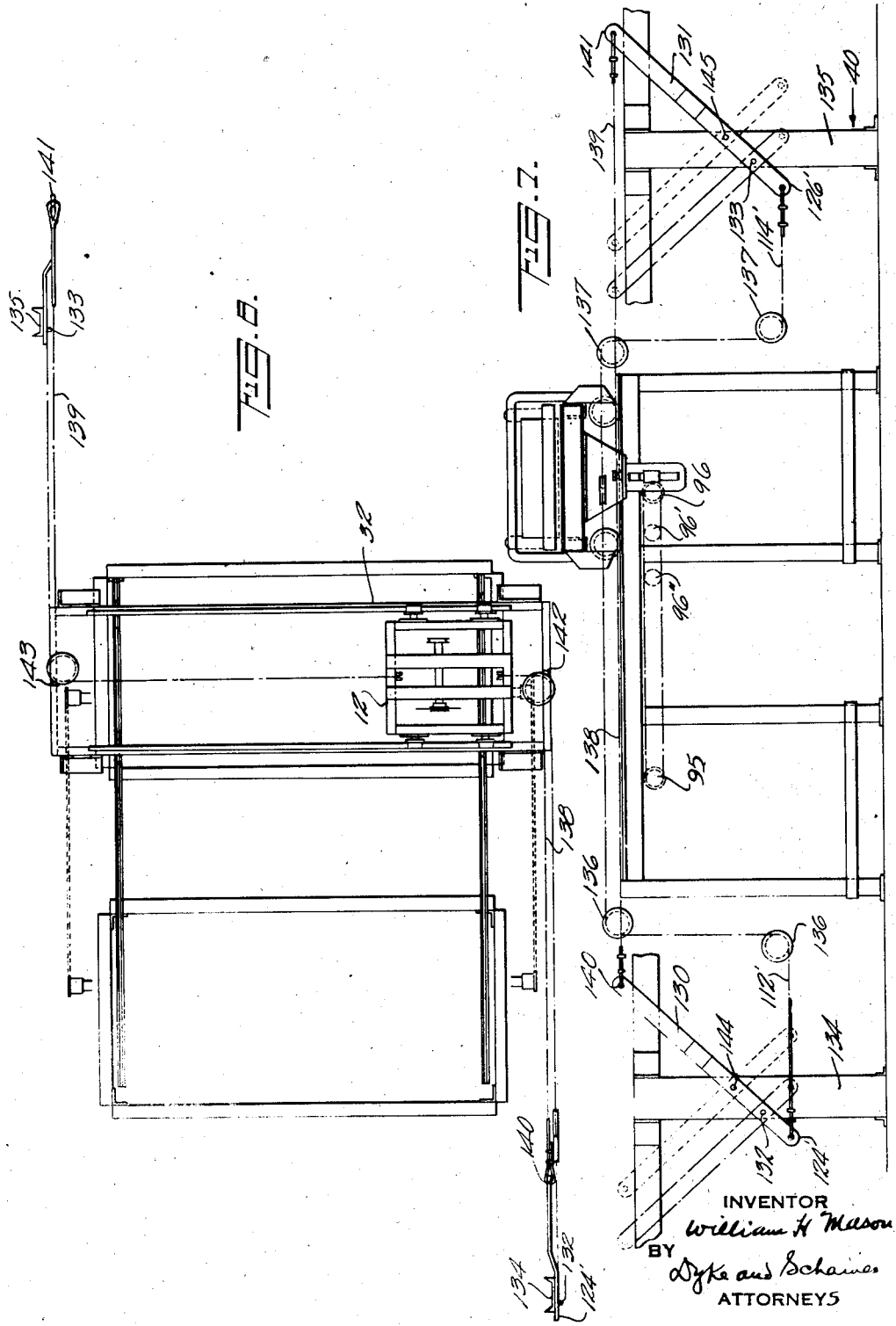

Patented Aug. 29, 1933

1,924,162

UNITED STATES PATENT OFFICE 1,924,162

CUT-OFF MACHINE

William H. Mason, Laurel, Miss., assignor to Masonite Corporation, Laurel, Miss., a Corporation of Delaware Application October 18, 1930. Serial No. 489,594

19 Claims. (Cl. 164—68)

My invention relates to apparatus for cutting a sheet of fibrous composition or the like while said sheet is in motion as it comes from a sheet forming machine, such as a Fourdrinier machine or the like.

The main object of my invention is to provide an improved device for cutting a continuously moving sheet of fibrous composition into predetermined lengths.

One machine for the manufacture of fibre board, to which my present invention can be applied, is described in my United States Patent No. 1,767,539. In this machine, a mass of liquid pulp is run onto a travelling screen and formed into a continuous sheet. The travelling sheet, after leaving the screen, is cut into sections of predetermined lengths and conveyed to a press.

By application of my invention to such machine, efficient cutting off can be obtained when the machine is run at much higher speed than heretofore, with marked improvement in smoothness and quietness of operation, and adjustments can be readily made to vary the length of the sections cut off.

I mount a cutter carriage having a rotary cutter and motor attached thereto, upon a second or main carriage that is itself slidably mounted on a supporting structure above a roller conveyor used for conveying the continuous sheet of fibrous composition. Such second carriage is moved forward with the work while the cutter carriage is moved across the second carriage transversely to the moving work, and during such movement of the two carriages, the cutter is down and is thus adapted to make a cut across the sheet. An elevating means is employed to elevate the cutter during the return movements of the two carriages whereby the cutter it out of operation because of being raised above the moving sheet, permitting the required length of sheet to be fed before the cutting operation is repeated. The cutter is counterweighted to avoid shock incident to its up-and-down movement.

In the drawings:

Fig. 2 is a side elevation thereof;

Fig. 3 is an enlarged sectional view taken approximately on the line 3—3 of Fig. 1;

Fig. 4 is an enlargd section of a cutter carriage track raising member taken on the line 4—4 of Fig. 3;

Fig. 5 is a side elevation with parts broken away of the cutter carriage track elevating member with the track in low position;

Fig. 6 is a detail showing the cutter carriage track in elevated position;

Fig. 7 is a diagrammatic side elevation showing a method of changing the machine for cutting various size boards; and Fig. 8 is a plan view of the apparatus shown in Fig. 7.

Figure 1:
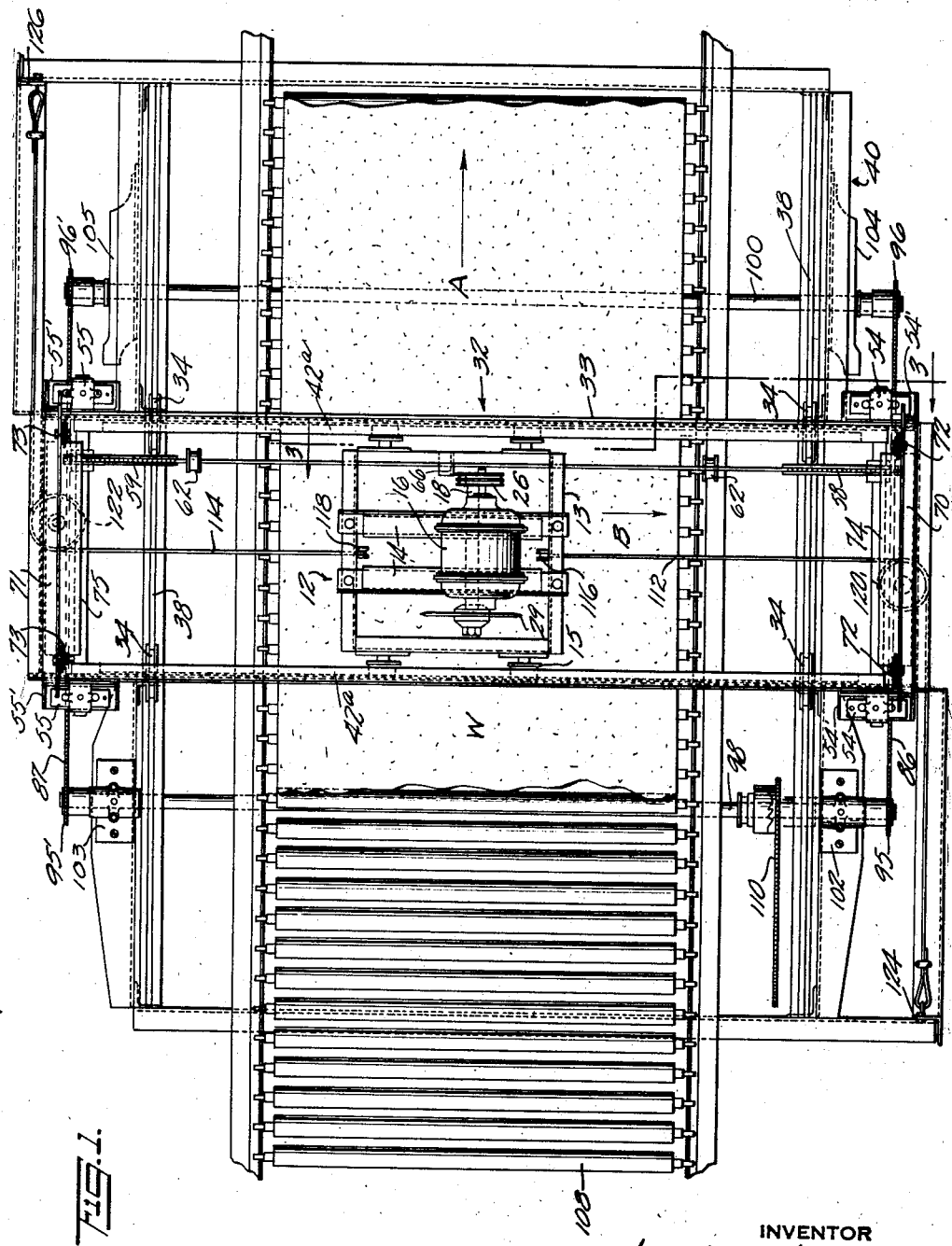
Figure 1 is a plan view of apparatus embodying my invention, showing the main carriage and the cutter carriage above the wet board of work conveyor and supporting structure, and at about the mid points of carriage travel.

The cutting device is designated generally by the reference character 10, and comprises a carriage 12 consisting of a frame 13 provided on its upper side with two cross bars 14, and said frame being mounted on wheels 15. A motor 16 is mounted on bars 14 forming substantially a motor bed. A countershaft 18 is mounted in bearings 20 secured to bars 22 on the under side of frame 13, said countershaft 18 having a pulley 24 at one end thereof and being driven by a pulley 26 on the motor shaft through belt 28. Shaft 18 drives a rotary cutter 29, preferably provided with saw teeth, which is bolted to the end of the shaft 18 opposite pulley 24.

Carriage 12 is adapted to move back and forth across the machine. As shown, the carriage wheels 15 run on tracks 31 supported on the second or main carriage 32 in a manner permitting vertical movement of the tracks and cutter carriage and to be described later.

This main carriage 32 comprises a rectangular frame 33 having wheels 34 rotatable in bearings 36 on its under side and running on tracks 38 extending longitudinally on each side of the machine and supported by a stationary structure, such as the I-bars 40.

The tracks 31, for wheels 15 of the cutter carriage 12, are carried by vertically movable members 42, preferably of substantially H-form (Fig. 4) and having upwardly extending angle bars 42ª welded or otherwise secured thereto to prevent wheels 15 of carriage 12 from jumping off tracks 31. These members 42, tracks 31, and angle bars 42ª constitute a fixed assembly which is guided laterally to move up and down in an open topped channel 43 between guide plates 44 forming a part of frame 33 of main carriage 32, and is guided against longitudinal displacement by being received between the end portions of frame 33 (Fig. 5). Said guide plates may conveniently constitute the side flange members of a pair of angle bars 44ª, 44ᵇ welded together by the bottom flanges, and having holes 44ᶜ in the bottom flanges for passage of connecting rods 46. Members 42 and tracks 31, 42ᵃ, and carriage 12 are given a substantially parallel up and down movement by means of four connecting rods 46 pivotally secured at 48 to the vertically movable members 42 near the ends thereof, and connecting same at 50 with the throws of two crank shafts 52 and 53. The crank shafts 52 and 53 are mounted in bearing members 54 and 55 secured to the guide members 44 on frame 33, as by means of brackets 54' and 55' and are driven from sprockets 56 and 57 secured thereto. Short lengths of sprocket chain 58 and 59 engage the sprockets, and with link connecting link bars 60, 60 form substantially an endless sprocket chain or belt. Each of said bars 60 has a collar 62 secured thereto so that said collars 62, 62 are substantially oppositely disposed relative to each other, and are arranged in the upper and lower reaches respectively of the endless sprocket chain.

Crank shafts 52 and 53 are actuated from the carriage 12, as by means of a depending arm 66 having a forked part 68 straddling the sprocket chain link bars 60 between the collars 62, 62 (Fig. 5) and being adapted to engage one of said collars 62 near the end of the forward stroke of carriage 12 and the other of said collars 62 near the end of the return movement.

In order to counterbalance the weight of the cutter frame 12 and other vertically movable parts and reduce the shock incident to quick movement thereof, supporting yokes 70 and 71 are fixed to the respective ends of the frame 33, and sprockets 72 and 73 mounted thereon. Sprocket chains 76 pass over the said sprockets 72 and 73 and have counterweights 74 and 75 attached to their ends at 78 and 79, while the other depending ends 80 and 81 of the chains are fixed to the vertically movable track carrying member 42 to be counterbalanced.

The main carriage 32 is given a forward movement with the work and returned by means actuated from and synchronized with the board making or Fourdrinier machine. As here shown, this is accomplished by two blocks 82, 82, one pivotally secured to a sprocket driven chain 86 on the forward side of the machine, and another to chain 87 on the opposite side, said blocks 82, 82 slidably engaging slots 88 in arms 90 secured to channel members 92 which are fixed to the frame 33 of carriage 32 at 94.

The chains 86 and 87 engage sprockets 95, 96, and 95' and 96', secured to shafts 98 and 100, the shaft 98 carrying sprockets 95—95' being mounted in bearings 102 and 103 secured to the stationary supporting structure 40, while the shaft 100 carrying sprockets 96 is mounted in bearings 104 and 105 which are slidably mounted for adjustment in ways 106 fixed to the structure 40.

Shaft 98 is driven through a sprocket and chain drive 110 from the Fourdrinier or board machine, thereby synchronizing the forward movement of the carriage 32 with the movement of the wet board.

Means are provided whereby cutter carriage 12 receives its actuation from the forward and return movement of the main carriage 32. In the illustrated construction, the ends of two cables 112 and 114 are secured to opposite ends 116 and 118 of carriage 12, then engage grooved pulleys 120, 122 mounted one at each side of the main carriage 32, and have their other ends anchored at 124 and 126 to opposite corners of the supporting structure 40. The pulleys 120, 122 and anchorages 124, 126, and cables 112 and 114 are positioned so that each cable in passing around its pulley 120 or 122 forms a right angle, the cable bights extending from each of the pulleys 120, 122 to the carriage 12 being at right angles to the cable bights extending from the pulleys to anchorages 124, 126, thus providing a uniform transverse pull upon the cutter carriage 12 as carriage 32 is moved.

The described apparatus operates as follows:

The wet board W is conveyed by continuously driven rollers 108 while the carriage 32 moves forward in the direction of arrow A a predetermined distance with the moving board and at the same speed as the board, then backward a like distance opposite the movement of the board.

When the carriage 32 reaches the end of its forward movement, the blocks 82 secured to chains 86 and engaging slotted arms 90 on the carriage 32 are carried backward after having passed around sprockets 96 during which time the speed of the carriage 32 is changeable, first decelerating, then stopping to reverse direction, and then again becoming uniform as the block moves from sprocket to sprocket and at the sprockets 95 the same condition is repeated.

While the carriage 32 moves forward, the pulley 120 engaging the cable 112 is forced against same and by increasing the distance between pulley and cable anchorage 124 causes the end of such cable secured to the cutter carriage 12 at 116 to be drawn toward the pulley 120 and therewith the carriage 12. At the same time, the pulley 122 engaging cable 114 moves toward the cable anchorage 126, thereby allowing the carriage 12 to move continuously in the direction of the arrow B to the limit of its movement.

When the movement of the carriages 12 and 32 is in the direction shown by their respective arrows B and A, the carriage 12 is moving along its lower elevation with the rotary cutter 29 cutting the wet board W as shown in Fig. 3. As the carriage 32 approaches the limit of its stroke, as described, the arm 66 engages the collar 62 that is in front of it and forces same from the full line position to the broken line position shown in Fig. 5 which causes the chains 58 and 59 to be moved a like distance and rotate the crank shafts 52 upward through an arc of 180°. During this movement the connecting rods 46 elevate said members 42, tracks 31, and carriage 12 on said tracks, and raise the cutter 29 out of engagement with the wet board W. The carriage 12 returns along the elevated tracks.

When the carriage 32 is approaching the end of its return movement, the cutter carriage is likewise approaching the end of its return movement, at which time the arm 66 engages the other one of said collars 62, causing same to move the chains 58 and 59, rotate the crankshafts 52, 53 downward through an arc of 180° and return the carriage to the lower level. It will be seen that the cutting takes place during that part of the movement of the main carriage 32 that is at uniform speed, and the speed of main carriage 32 at times of raising and lowering the cutter can vary more or less without interfering with straight cross-cutting of the board.

With the described arrangement, the cutter travels across the sheet at the same speed as the sheet and main carriage travel so that the movement of the cutter relative to the floor under the machine is on an angle of 45° to the longitudinal axis of the machine.

In Figs. 7 and 8 I have illustrated simple means for adapting the apparatus to cut the wet lap into two shorter lengths than are available with the form shown in Figs. 1 to 6, which is desirable in order to produce boards of various lengths to suit market requirements without undue trimming.

To do this, the main carriage drive sprocket system is altered in a manner to reduce the main carriage travel by reducing the distance between sprocket centers, as, for example, for a first reduction of board length sprocket 96 may be adjusted to station 96', Fig. 7, or for a still shorter board to station 96". In making such shift it is convenient to make use of a substitute shorter sprocket chain and pivot block assembly 86, 82. With such arrangement, the main carriage still travels forward at the work speed, but accompanies the work for a shorter distance of its forward travel.

In order to speed up the cutter carriage so as to complete its steps of lowering, cutting across, raising and return within the reduced travel length along with the work, without making any change in the cross carriage and cutter arrangement, I preferably make use of power derived from travel of the main carriage, and so arrange that the cables for actuating the cutter, instead of being fixedly anchored at their ends remote from attachment to the cutter carriages, are attached at such ends to members which are so actuated by movement of the main carriage as to produce the requisite speeding up and quick completion of the cross carriage cutter movement that is required to secure the necessary greater number of cutting actions per foot of work travel.

One mode of effecting this result is by pivotally connecting the ends 124', 126' of cables 112' and 114' to the lower ends of levers 130, 131 which are pivoted at 132, 133 to supports 134, 135, carrying these cables over pulleys 136, 137 to bring the ends to the desired points, and to pivotally connect the opposite ends of said levers to the main carriage 32 by means of cables 138, 139 provided for this purpose and connected to levers 130, 131, at 140, 141, and to carriage 32 at 142, 143.

With such arrangement, movement of carriage 32 to the left (Fig. 7) will pull lever 131 from full-line to broken-line position by means of cable 139 moving with the carriage 32, and so advance cable 114' and speed up cross cutter-carriage 12 as to finish its one-way cross movement within the reduced range of wet lap travel available, and cable 112' being pulled by carriage 12, will turn lever 130 from its full-line to its broken-line position, thereby keeping cable 138 taut; and on reverse movement of carriage 32, cables 138 will turn lever 130, advance cable end 124', and cable 112', and thereby produce increased return speed of cross cutter carriage 12. Still shorter boards, and closer together cuts to produce same, can be obtained by further reducing the length of main carriage travel with the work, as, for example, by spacing a sprocket wheel at 96", and so arranging levers 130 and 131 to further speed up the cutter carriage, as by pivoting same at 144, 145, the length of cable connections being adapted to the change in length of lever arms. The fixed anchorage of Figs. 1 to 6 for cables 112 and 114 can be obtained by attaching these cables, as 112', 114' are attached in Figs. 7 and 8, and inserting pivot pins at both pivotal points of the levers as 132, 144 in case of lever 130, in which case cables 138, 139 are out of use and the original spacing of sprockets 95, 96 is undisturbed.

My invention includes changes which may be resorted to within the scope of my claims:

1. Means for cutting a travelling sheet into lengths during travel comprising means for continuously conveying said sheet, a main carriage, a continuously operating mechanical connection between said conveying means and said carriage to cause the latter to travel forward with the sheet and back, a cutter carriage and cutter adapted to travel across the first carriage, and cable and sheave means whereby the travel of the first carriage produces the travel of the second carriage.

2. Means for cutting a continuously travelling sheet into lengths during travel comprising a carriage travelling forward with the sheet and back, a cutter carriage and cutter adapted to travel across the first carriage, and cable means attached to the cutter carriage and sheave means moving with the first carriage and coacting with the said cable means whereby the travel of the first carriage produces the travel of the second carriage.

3. A cutting device adapted to cut a continuously moving composition board into predetermined lengths comprising a continuously driven cutter, a cutter carriage to support same, a longitudinally movable main carriage to support said cutter carriage, means for advancing said main carriage at substantially the speed of the board for substantially one-half of the cut board length and returning said main carriage while the second half of said board length is feeding forward, means for allowing the cutter to engage the board and means for moving the cutter carriage across the main carriage while the cutter is engaging the board and the main carriage is advancing and for returning the cutter carriage with the cutter disengaged when the main carriage is returning.

4. A cutting device adapted to cut a continuously moving composition board into predetermined lengths comprising a rotary cutter, a cutter carriage to support same, a longitudinally movable main carriage to support said cutter carriage, a reciprocating drive for said main carriage comprising blocks secured to sprocket chains and slidable in slotted arms on said main carriage, tracks on said main carriage to guide the cutter carriage, means to elevate the tracks and cutter carriage after a cut has been completed to permit return of said cutter carriage without cutting, and means for moving the cutter carriage transversely to the moving board comprising cables fixed to the supporting structure and cutter carriage and sheaves on the main carriage which are adapted to engage the cable and move the cutter carriage in either direction across the moving board depending upon the direction of travel of the main carriage.

5. A cutting device for use on a wet composition board conveying apparatus to cut the moving board into predetermined lengths comprising a cutter member, means for moving said cutter member transversely to the moving board, and adjustable means to correct the travel speed of said cutter member for varied board sizes.

6. Means for cutting a continuously travelling sheet into lengths comprising a fixed support, a movable member mounted thereon, a main carriage travelling forward with the sheet and back, a cross carriage and a rotary cutter carried by and movable transversely to the main carriage, means whereby back and forth movement of the main carriage with respect to said fixed support is utilized to produce back and forth movement of the cutter carriage, and means whereby back and forth movement of the main carriage produces back and forth movement of the cutter carriage at a modified speed by imparting movement to said movable member.

7. In combination, a reciprocating carriage, a cutter carriage and cutter reciprocatingly movable transversely thereon, means for raising and lowering the cutter carriage and cutter substantially at opposite ends of its travel, and means for counterbalancing the cutter and cutter carriage.

8. In combination, a reciprocating main carriage, a cutter and cutter carriage transversely reciprocable thereon in guides, means for elevating and lowering the cutter carriage substantially at the respective ends of its travel, and counterbalancing means applied to substantially the four corners of the cutter carriage.

9. In combination, a reciprocable main carriage, a transversely reciprocable cutter carriage and cutter thereon, means whereby main carriage movement produces cutter carriage movement, including means whereby main carriage movement imparts increased speed to the cutter carriage.

10. In combination, fixed supports, a main carriage reciprocable with respect thereto, a transversely reciprocable cutter carriage and cutter thereon, cable members respectively attached to the cutter carriage and to said fixed supports, and sheave members on the main carriage engaging said cable members to actuate the cutter carriage.

11. In a cut-off machine for continuously moving wet lap fibre sheets, a longitudinally reciprocable main carriage movable forwardly with the work, a pair of tracks extending transversely thereto and arranged for translating up and down movement upon the main carriage, a cutter carriage and cutter reciprocable on the said tracks, and means operated from the cutter carriage to lower said tracks for advance cutter carriage movement and to raise same for return movement of the cutter carriage.

12. In combination, means for continuously moving a web or sheet of material, a main carriage, means actuated by said first named means for imparting reciprocatory movement to said carriage in a direction parallel to the line of movement of said sheet of material, a cutter carriage mounted on said main carriage, and means actuated by the main carriage for imparting reciprocating movement to said cutter carriage in a direction transverse to said line of movement.

13. The combination of claim 12 in which the means for imparting movement to the main carriage in the direction of movement of the sheet of material is so coordinated with respect to the means for continuously moving the sheet of material as to cause the main carriage to move at the same speed as said sheet.

14. The combination of claim 12 in which the means for imparting movement to the cutter carriage is so coordinated with respect to the means for continuously moving the sheet of material and the means for imparting reciprocatory movement to the main carriage as to cause the cutter carriage to move during the cutting operation at the same speed as the sheet of material.

15. The combination of claim 12 in which means are provided for varying the speed at which the cutter carriage travels without varying the speed of the sheet of material or main carriage.

16. The combination of claim 12 in which the means for imparting reciprocatory movement to the cutter carriage comprises a flexible tension member one end of which is secured thereto and the other end to a fixed support.

17. The combination of claim 12 in which the means for imparting reciprocatory movement to the cutter carriage comprises a flexible tension member, one end of which is secured thereto and the other end to a movable member which is moved to vary the speed of the cutter carriage with respect to the sheet of material.

18. In combination, a fixed support, a main carriage reciprocable with respect thereto, a transversely reciprocable cutter carriage and cutter thereon, cable means respectively attached to the cutter carriage and to a movable member mounted on said fixed support, and a connection between said main carriage and said movable member for actuating the same.

19. The combination of claim 18 in which the movable member is a lever pivotally mounted on the fixed support.

WILLIAM H. MASON.